United States Patent [19]

Martin

[11] 4,362,272
[45] Dec. 7, 1982

[54] MANURE SPREADER WITH MULTIPLE SIDE AUGER

[75] Inventor: Mervin G. Martin, Myerstown, Pa.

[73] Assignee: Hedlund Manufacturing Co., Inc., Boyceville, Wis.

[21] Appl. No.: 172,976

[22] Filed: Jul. 28, 1980

[51] Int. Cl.³ .............................................. A01C 23/00
[52] U.S. Cl. ........................................ 239/7; 198/664; 222/238; 222/412; 239/662; 239/666; 239/675; 239/681; 366/186; 366/603
[58] Field of Search ............... 239/650, 662, 664, 666, 239/670, 675, 676, 677, 679–681, 689, 684, 7; 366/186, 321, 325, 327, 603; 222/238, 412, 414; 198/533, 558, 664–666, 676, 642

[56] References Cited

U.S. PATENT DOCUMENTS

| | | | |
|---|---|---|---|
| 76,529 | 4/1868 | Rush | 198/664 |
| 365,519 | 6/1887 | Hotham | 239/675 X |
| 368,182 | 8/1887 | Birkholz | 198/665 |
| 1,235,427 | 7/1917 | Bridewell et al. | 198/676 X |
| 2,240,720 | 5/1941 | Selworst | 198/642 X |
| 2,614,849 | 10/1952 | Holben | 239/670 |
| 3,028,999 | 4/1962 | Polzin et al. | 222/238 X |
| 3,037,780 | 6/1962 | Skromme et al. | 239/670 |
| 3,159,406 | 12/1964 | Morr et al. | 239/675 X |
| 3,322,429 | 5/1967 | Cervelli | 239/675 X |
| 3,420,452 | 1/1969 | Vaughan | 239/666 X |
| 3,443,763 | 5/1969 | Wolford | 239/666 |
| 3,526,344 | 9/1970 | Koning | 198/533 X |
| 3,598,325 | 8/1971 | van der Lely | 239/665 |
| 3,706,442 | 12/1972 | Peat | 366/603 X |
| 3,768,737 | 10/1973 | Tobias | 239/666 |
| 3,964,714 | 6/1976 | Crawford et al. | 239/662 |
| 4,013,224 | 3/1977 | Carter | 239/675 X |
| 4,014,271 | 3/1977 | Rohlf et al. | 239/662 X |
| 4,069,982 | 1/1978 | Brackbill | 239/679 X |
| 4,082,227 | 4/1978 | McGrane et al. | 239/675 |

FOREIGN PATENT DOCUMENTS

| | | | |
|---|---|---|---|
| 1306804 | 9/1962 | France | 239/662 |
| 495229 | 6/1954 | Italy | 239/675 |

OTHER PUBLICATIONS

Ad. Sheet Titled, "Martin Liquid Manure Tank, Model V2250 Gal.", Martin Manufacturing Company, Myerstown, Penna.
Gehl Catalog Titled, "Manure Spreaders".
John Deere Catalog Titled, "Manure-Handling Equipment".
Calumet Company Inc. Catalog Titled, "Calumet Spreader Tanks".
Article Titled, "McLanahan-Pioneer Developers of the Modern Steel Log Washer", McLanahan and Stone Corporation, Penna.
Brochure Titled, "McLanahan Log Washers–Remove Dirt Faster, More Economically", McLanahan and Stone Corporation, Penna.
Brochure Titled, "McLanahan Mudmaster Log Washer".
Brochure Titled, "Mudmaster Log Washer", McLanahan Corporation, Penna.

*Primary Examiner*—Andres Kashnikow
*Attorney, Agent, or Firm*—Jacobson and Johnson

[57] ABSTRACT

The manure spreader includes a wheeled, V-shaped body having a longitudinally positioned impeller rotatively carried near the bottom of the V-configuration. The impeller blades are positioned on a multi-sided body and are arranged in oppositely generated helices to urge the manure both from the rear of the body and from the front of the body toward an outlet gate which is positioned in the body intermediate its ends. A rotary spinner is carried outwardly of the body in position to receive the effluent from the outlet gate and a suitable drive mechanism is provided to rotate the spinner at many times the rotative speed of the impeller. The spinner and the impeller are simultaneously rotated by a common drive, which may be a tractor PTO, and an adjustable deflector is provided in effluent path from the spinner to easily vary the spray pattern.

42 Claims, 8 Drawing Figures

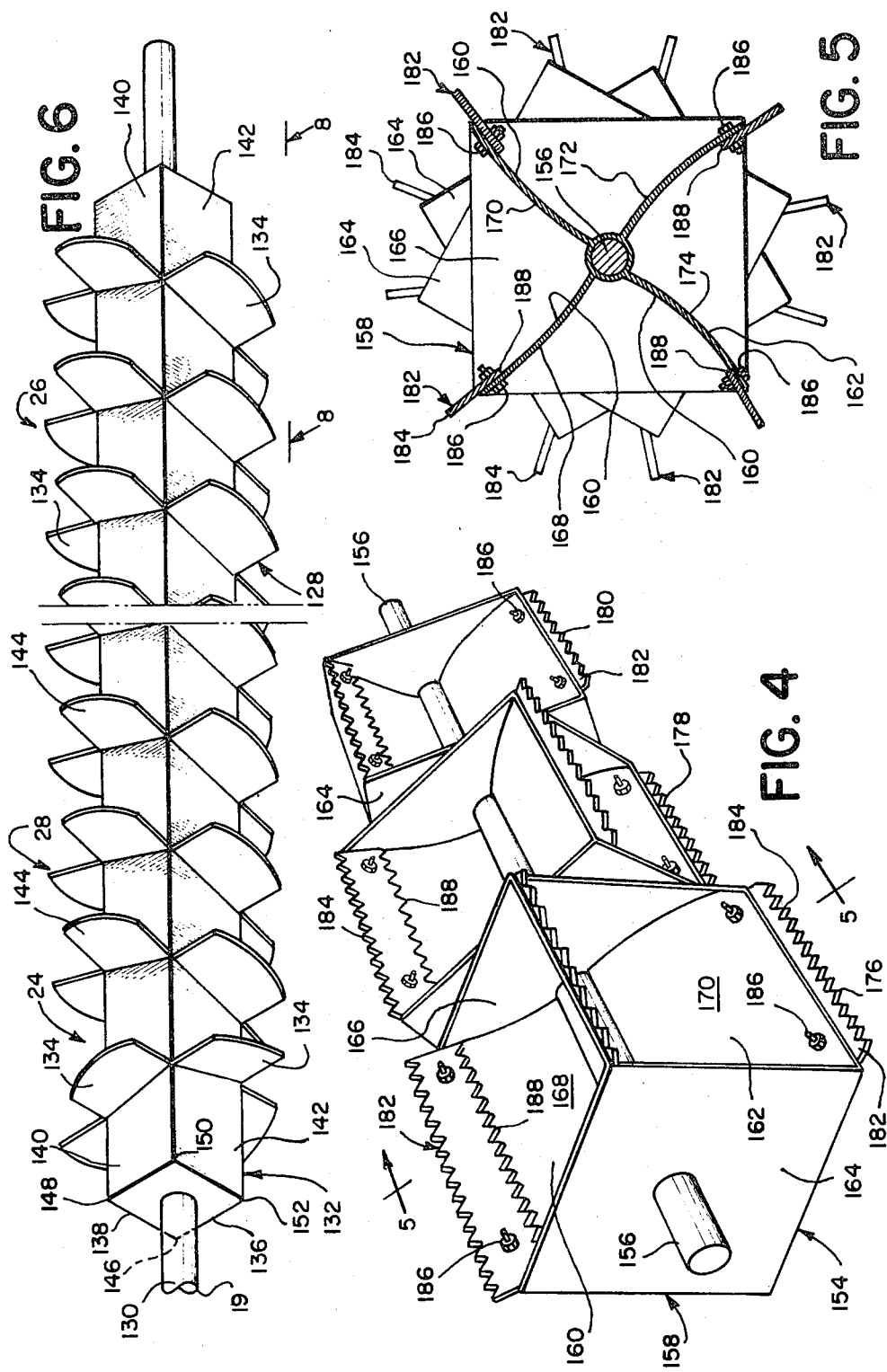

MANURE SPREADER WITH MULTIPLE SIDE AUGER

BACKGROUND OF THE INVENTION

The invention relates generally to a novel manure spreader, more particularly, is directed to a manure spreader including both a slow speed impeller and a high speed spinner positioned to receive a flow of manure from the impeller and to spray the manure outwardly in a desired spray pattern.

Many types of spreaders have been developed by prior workers in the field which are usually employed in and about farms to utilize the fertilizer value of manure from herds of farm animals, for example, diary cattle, in an efficient and economical manner. The prior art manure spreaders have included flair type spreaders which are generally most commonly employed for use with solid manners. Other workers in the art have developed spray type spreaders which employ necessary tanks, hoses and accessory equipment to effectively distribute liquid manures. Such wet type manures usually must first be processed to add sufficient water to permit use with the spray equipment. Both flail type spreaders and spray type spreaders have been generally and widely utilized in the past and both types are quite common. However, certain operating difficulties and inefficiencies have arisen with the presently available spreading equipment due to the nature of the manures available for distribution. For example, spreaders designed for solid application, such as the flail type spreader, cannot readily be employed for use with liquid manures. Such types are particularly designed for use with solid manures and because of this, have limited storage capacity during periods of application. Also, because of the load characteristics inherent when spreading solid type manures, the prior art type of flail type spreader had to be ruggedly constructed and all parts had to be designed to increased strength to handle the solid materials. Despite the increased structural strength capabilities built into the equipment, there has been evidence of considerable wear and breakage, such as bearing wear, chain breakage and mechanical damage to the operating parts due to the nature of the solid manures.

In the case of prior art liquid type spreaders, the presently available prior art types incorporate a tank-like vehicle which is suitable only for use in the application of liquid manures. Accordingly, such spray type spreaders were suitable for use only with waste materials that had previously been pretreated prior to introduction into the tank of the spreader vehicle in order to provide an effluent specifically designed for use with the specific spreader. So far as is known, except for the composite manure spreaders recently previously designed by the present applicant, and fully described in copending application Ser. No. 170,034 titled MANURE SPREADERS filed July 18, 1980, no other presently available equipment is known which is capable of disbursing either liquid or semi-liquid type manures or combinations thereof in a single apparatus.

SUMMARY OF THE INVENTION

The present invention relates generally to a liquid and semi-liquid type manure spreader, and more particularly, is directed to a manure spreader incorporating a V-shaped body for holding the manure, an impeller having a plurality of planar sides and blades positioned near the bottom of the body to direct the manure, an outlet gate in a side of the body and a high speed spinner receiving the effluent from the gate for spray distribution as the spreader is propelled.

The manure spreader of the present invention includes a wheeled, open tank into the top of which liquid and/or semiliquid manures can be easily fed by using existing, readily available loading equipment. The body of the spreader is generally V-shaped in cross-sectional configuration and incorporates near the bottom thereof a heavy duty, chopper-type auger or impeller. The impeller includes an elongated body including planar sides and a plurality of separate blades angularly outwardly projecting from the sides. The impeller is longitudinally positioned near the apex of the V-shape of the body and has its blades positioned generally in the configuration of a helix, a rear portion of which helix is designed to propel manure from the rear of the tank to a medially positioned manure exit gate and a front portion of which helix is designed to propel manure from the front of the body toward the medially positioned gate.

A high speed spinner is affixed in rotary engagement exteriorly of the spreader body in position to receive the effluent from the gate and to direct the effluent in a spray pattern over the field to be so treated. Preferably the spinner rotates at a rotative speed that is from ten to fifteen times the rotational speed of the impeller. The drive of the spinner is preferably taken from the drive of the impeller whereby both devices are rotated in unison, in opposite directions and at proportional rates of speed. A hinged deflector can be employed in conjunction with the spinner in the path of the effluent from the spinner to vary the spray pattern to suit the existing field conditions.

In the preferred embodiment, the spinner is provided with a plurality of angularly offset buckets or scoops whereby only a portion of the buckets will be in the same relative angular contact with manure at any given instance. In this manner, the staggering of the scoop angular orientation results in a device that is capable of operation at greatly reduced horsepower requirements. The spinner scoops are preferably forwardly curved to provide a better manure throwing pattern.

It is therefore an object of the present invention to provide an improved manure spreader of the type set forth.

It is another object of the present invention to provide a novel manure spreader which includes an open, V-shaped tank with a longitudinally aligned, double direction, planer sided impeller positioned near the bottom of the body.

It is another object of the present invention to provide a novel manure spreader featuring an open tank with side outlet and an impeller having a plurality of planar sides and separate blades suitable to move liquid and semi-liquid material from both the front of the tank and fron the rear of the tank through the side outlet to a spinner for spreading purposes.

It is another object of the present invention to provide a novel manure spreader including an open tank equipped with a square auger having a plurality of individual chopper type blades, some of the blades being arranged in a forwardly directed helix and other of the blades being arranged in a rearwardly directed helix, the tank having a side opening intermediate its ends wherein the auger directs the manure to the side opening, a spinner positioned at the side opening exteriorly of the tank for spraying the manure and a drive mechanism arranged to rotate the spinner at many times the rotational speed of the auger.

It is another object of the present invention to provide a novel manure spreader including a generally V-shaped tank, a dual directional impeller longitudinally arranged interiorly of the tank, the impeller having a square body, a spinner rotatively carried outside of the tank in position to receive the effluent from the impeller intermediate the ends of the tank and means to rotate the spinner at many time the rotative speed of the impeller.

It is another object of the present invention to provide a novel manure spreader comprising an open, generally V-shaped tank, an impeller feature a square body longitudinally arranged for rotation near the bottom of the body for manure directional purposes, a spinner receiving the effluent from the impeller and being rotatively positioned exteriorly of the body, a drive means rotating the impeller and the spinner, the drive means including means to rotate the spinner at from ten to fifteen times the rotational speed of the impeller and means to vary the spray pattern of the effluent from the spinner.

It is another object of the present invention to provide a novel liquid and semi-liquid manure spreader that is simple in construction, rugged in design and trouble-free when in operation.

Other objects and a fuller understanding of the invention will be had by referring to the following description and claims of preferred embodiment thereof, taken in conjunction with the accompanying drawing, wherein like reference characters refer to similar parts throughout the several views and in which:

BRIEF DESCRIPTION OF THE DRAWINGS

FIG. 4 is an enlarged, perspective view of the spinner illustrated in FIGS. 1 and 2.

FIG. 5 is a cross sectional view taken along line 5—5 on FIG. 4, looking in the direction of the arrows.

FIG. 6 is an enlarged, perspective view of the impeller illustrated in FIG. 2.

FIG. 8 is a partial, side elevational view of the impeller of FIG. 2, looking from lines 8—8 of FIG. 6.

DESCRIPTION OF THE PREFERRED EMBODIMENTS OF THE INVENTION

Figure 1:
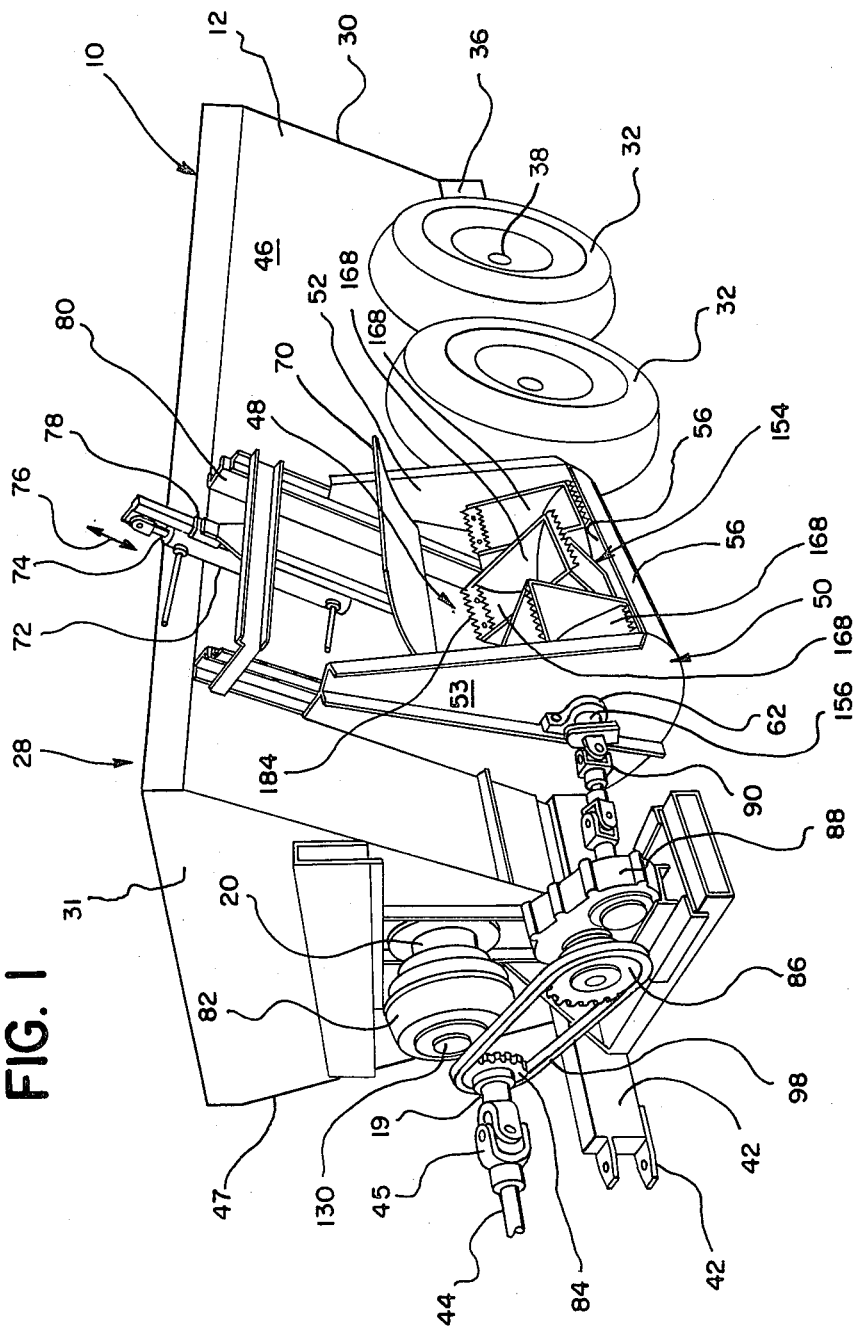
FIG. 1 is a front perspective view showing the manure spreader of the present invention.

Although specific terms are used in the following description for the sake of clarity, these terms are intended to refer only to the particular structure of the invention selected for illustration in the drawings, and are not intended to define or limit the scope of the invention.

Figure 2:
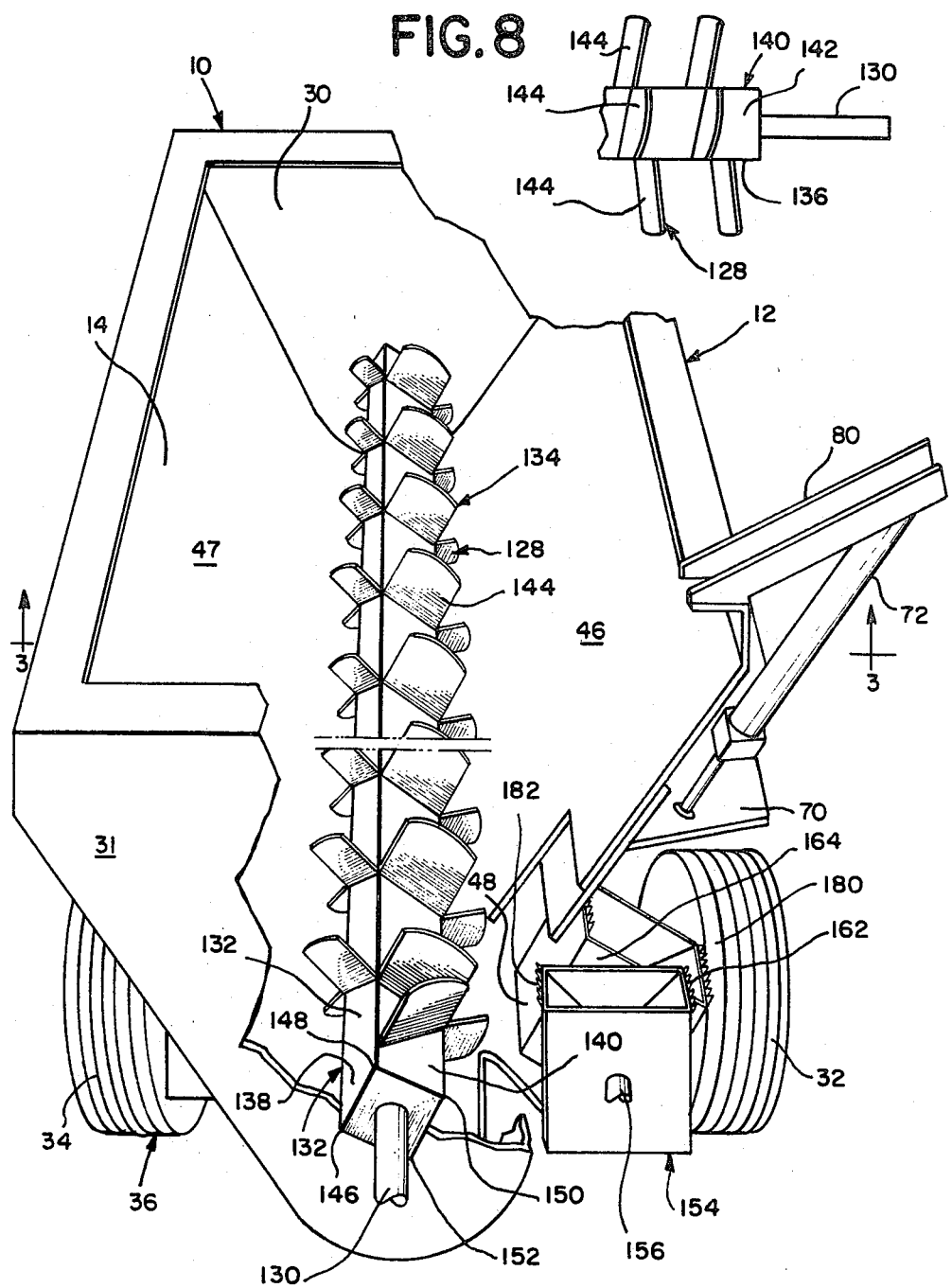
FIG. 2 is a top perspective view, partially broken away, showing the manure spreader of FIG. 1.
Figure 3:
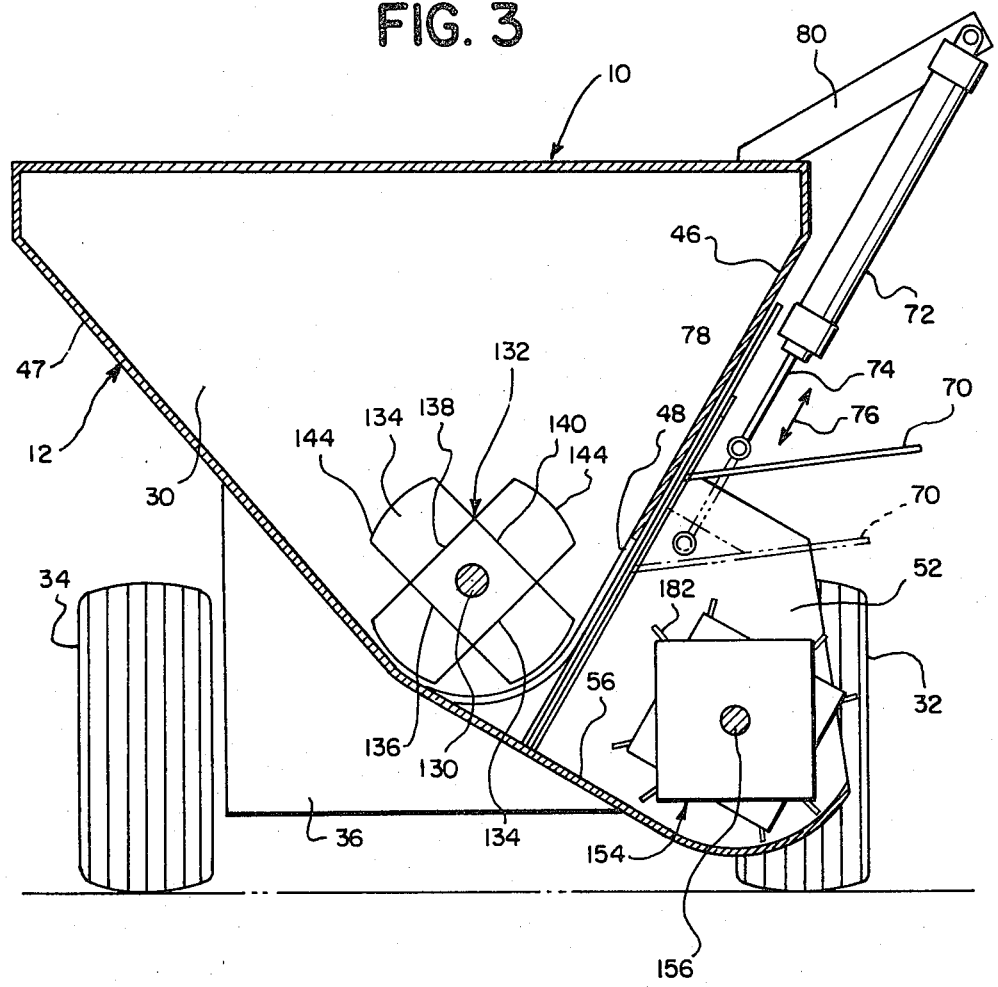
FIG. 3 is a cross sectional view taken along the line 3—3 of FIG. 2, looking in the direction of the arrows.

Referring now to the drawings, there is shown in FIGS. 1-3 a manure spreader generally designated 10 which comprises essentially a wheeled, tank type body 12 having an open top 14 into which the manure (not shown) to be spread can be readily dumped. The tank 12 is generally V-shaped in configuration and is carried upon a suitable, sturdy chassis 36 in a conventional manner. The chassis 36 is arranged for easy transport over the field to be treated by employing a plurality of right and left wheels 32, 34 mounted in pairs upon conventional axles 38 in well known manner.

The manure spreader 10 is conventionally transported and powered by a tractor or other farm equipment (not shown) in well known manner. For example, a hitch 42 is illustrated in FIG. 1 for usual towing connection to the piece of farm equipment. Power for operation of the device is also conventionally drawn from the tractor or other farm equipment through a rotating drive shaft 44 which is supplied with a suitable coupling 45 for connection to the tractor PTO (not shown) in usual manner.

As best seen in FIGS. 2 and 3, an impeller 128 is longitudinally positioned within the interior of the body 12 near the bottom of the V-configuration. The impeller 12 extends the entire length of the tank body 12 and forwardly has its shaft 130 coupled to the drive shaft 44 in known manner whereby the rotation of the drive shaft 44 by the tractor (not shown) will cause corresponding rotation of the impeller 128. The impeller shaft 130 is journalled within conventional forward and rearward bearings 20 for rotation relative to the tank or body 12. The impeller shaft 130 extends forwardly in a shaft extension 19 for powering the manure spreader system as hereinafter more fully set forth.

Referring now to FIGS. 2 and 6, it will be observed that the auger or impeller 128 includes an elongated body 132 having planar sides 136, 138, 140, 142 which are secured to the impeller shaft 130 in conventional, sturdy manner, such as by welding or other interconnection. A plurality of individual planar blades 134 are defined one from another and are welded or otherwise secured to the impeller body 132 in the general configuration of a helix for manure directing purposes. The helix is divided into a rearwardly directed helix 24 which acts to urge manure (not shown) contained within the tank 12 rearwardly within the body from the front wall 31 to the side outlet 48 and a longitudinally juxtaposed forwardly directed helix 26 which serves to urge the manure forwardly within the tank 12 from the rear wall 30 toward the side opening 48. The rearwardly directed helix 24 terminates rearwardly adjacent to the side opening 48. An unloading section 28 is defined at the interface between the rearward helix 24 and the forward helix 26 to efficiently direct the manure (not shown) through the side opening or gate 48. As illustrated, the forwardly directed helix 26 terminates forwardly adjacent to the side opening 48 at the unloading section 28. Accordingly, upon impeller rotation, the dual directed helices 24 and 26 tend to urge the liquid and semi-liquid manure contained within the tank 12, both from the front wall 31 and from the rear wall 30 toward the unloading opening 48. As illustrated, the unloading opening 48 is positioned closer to the tank body front wall 31 and further from the tank body rear wall 30.

One of the tank body inclined sidewalls 46 or 47 is provided with the side opening or gate 48 to permit the manure (not shown) contained within the tank body 12 and driven by the impeller 128 to exit therethrough for manure spreading purposes. The gate or opening 48 transversely aligns with the unloading section 28, for side unloading to the spinner 154. It is noteworthy that the unloading section 28 comprises the interface between the rearwardly directing helix 24 and the forwardly directing helix 26 which serves to urge or sweep the manure transversely through the opening 48 as the impeller 128 is rotated upon the application of rotative forces to the drive shaft 44.

Referring now to FIGS. 1 and 3, a spreader chamber 50 is welded or otherwise secured exteriorly to a tank sidewall 46 or 47 and comprises generally a right wall 52, a left wall 53 and an interconnecting floor or base wall 56. The manure spreading spinner 154 is mounted for rotation between the right and left spreader chamber walls 52, 53 and can have its shaft 156 journalled within respective front and rear bearings 62 in a conventional manner. As illustrated in FIG. 3, the spreader chamber floor 56 forms a continuation of the spreader body inclined wall 47 so that the manure delivered to the opening 48 through the interaction of the rearwardly directed helix 24, the forwardly directed helix 26 and the unloading section 28 dumps or flows the manure directly from within the tank 12 into the spreader chamber 50 for throwing or spreading by the spinner 154 as the spinner is rotated at high rotative speeds. If desired, a door (not shown) can be provided in known manner to close the opening 48 in the body wall 46 when the device 10 is not in use and to expose the opening 48 when it is desired to employ the spreader 10 for manure spreading purposes.

As above set forth, the spinner shaft 156 is journalled between the right and left bearings 62 and is positioned to receive and to propel the manure (not illustrated) which is driven into the spreader chamber 50 upon rotation of the impeller 128. It is a feature of this invention to rotate the spinner 154 many times faster than the speed of rotation of the auger or impeller 128. By driving the auger at a relatively slow rate of speed, the manure loaded within the interior of the tank 12 can be most advantageously directed to the opening or gate 48 without the stranding of solids upon the inclined body sidewalls 46, 47. The high speed rotation of the spinner 154 provides maximum efficiency in spreading or throwing the manure. Additionally, the construction comprising the opening or gate 48 combined with the slow speed of rotation of the impeller or auger 128 facilitates the handling of drier materials without stranding of the solids within the body prior to spilling into the spreader chamber 50.

Figure 7:
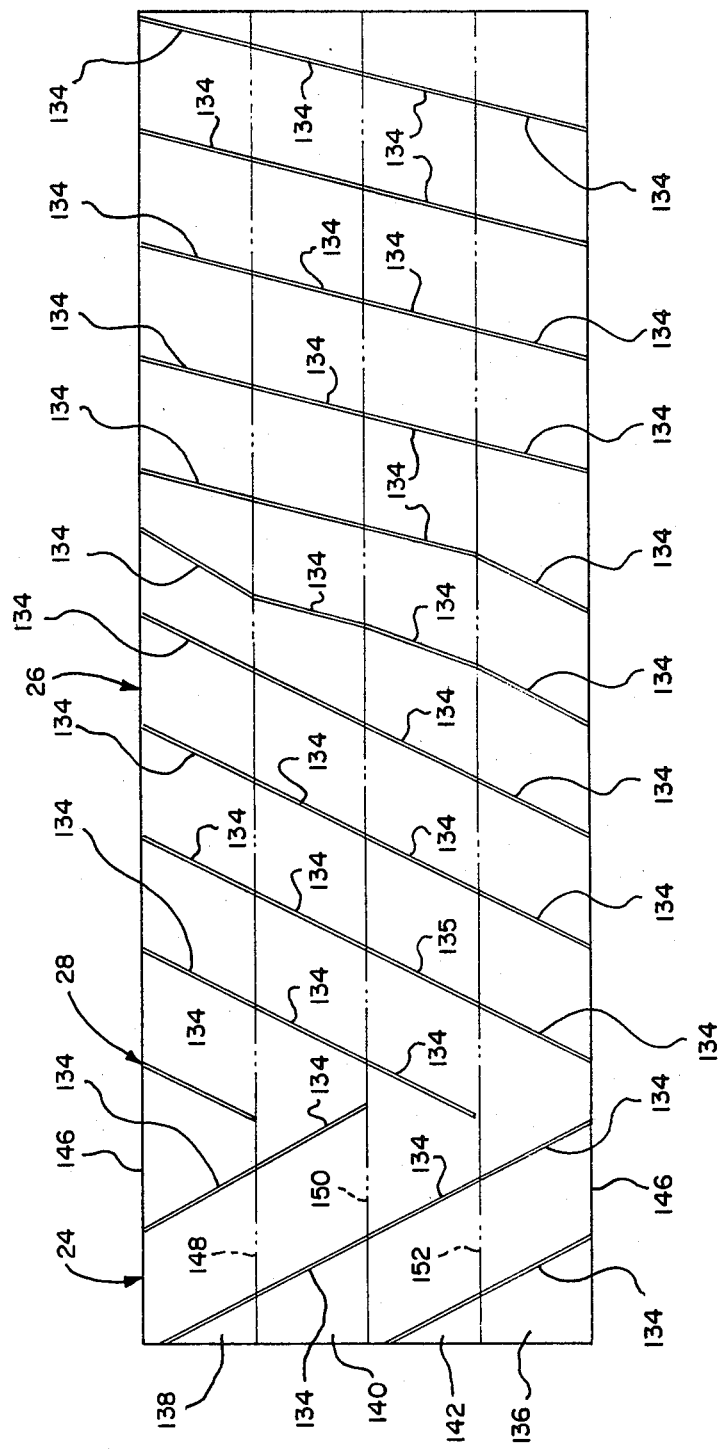
FIG. 7 is a developed plan view of the impeller body showing the developed position of the blades.

Due to this capability of handling a full range of materials from very wet to very dry, the manure spreader 10 of the present invention can be employed to handle a wider variety of materials to be spread in a troublefree and highly efficient manner. The individual auger blades 134 are preferably formed of planar steel sheet of sufficient thickness for the operation to provide adequate strength. The blades 134 extend in width the entire width of their associated auger sides 136, 138, 140, 142 and, as best seen schematically in FIG. 7, are positioned in dual, opposite helical arrangement. Additionally, as illutrated, the blades 134 are endwardly curved and extend near the bottom of the tank upon rotation for a better and more efficient manure movement forwardly and rearwardly through the tank 12.

Referring now to FIG. 1, one embodiment of a spinner drive mechanism will now be described. As illustrated, the auger shaft 130 extends through the front bearing 20 in a conventional shaft extension 19 to which is pinned or otherwise secured a first gear drive system 82. Accordingly, when the drive shaft 44 is connected to the tractor PTO (not shown) through the coupling 45, rotation of the drive shaft 44 causes simultaneous rotation of the impeller shaft 130 and the shaft extension 19. As above set forth, it is preferable to rotate the impeller shaft 130 at a relatively slow speed and the spinner shaft 156 at a relatively high speed. The power sprocket 84 drives a driven sprocket 86 through a conventional drive chain 98. The driven sprocket 86 in turn powers the second gear drive system 88 to thereby cause higher speed rotation of the shaft 156 through the coupling 90.

The drive system described is illustrative only, and it is contemplated that other gear systems or other mechanical drives can be employed to transmit rotative power from the tractor PTO (not illustrated) to rotate simultaneously the auger 128 and the spinner 154. See for example the gear drive train illustrated in my co-pending application, Ser. No. 170,034.

Preferably, the auger or impeller 128 is rotated by the drive shaft 44 at a rotative speed of approximately fifty revolutions per minute. Simultaneously, through the first and second gear drive systems 82, 88, above enumerated, the spinner 154 is optimunly rotated at a speed of from approximately five hundred and forty revolutions per minute to seven hundred and fifty revolutions per minute to provide an optimum spray pattern.

As illustrated in FIGS. 1, 2 and 3, in order to easily vary the spreader pattern, the spreader chamber 50 may be provided with an overhead deflector 70 which can be arranged for vertical or hinged adjustment relative to the spreader 154 in well known manner. In the embodiment illustrated, a hydraulic cylinder 72 is supported in pivotal manner from the body 12 through a stationary bracket 80 in a manner to reciprocally move the deflector 70 relative to the spinner 154. As best seen in FIG. 3, the cylinder 72 functions its piston rod 74 in the directions indicated by the arrow 76 to move the deflector 70 between the positions illustrated in full lines and phantom lines. In one embodiment, as illustrated, the deflector 70 may be provided with suitable guides 78 to facilitate the inclined, vertical movement indicated. If desired, the cylinder 72, the piston arm 74 and the deflector 70 could also be arranged to pivot the deflector relative to the spinner 154. As above set forth, the purpose of the deflector 70 is to vary the spray pattern, and this variation may be accomplished in any suitable, efficient manner.

As best seen in FIG. 3, the shaft 130 of the auger 128 rotatively carries an enclosing, elongated, rectangular or square cross section body 132 which can be secured to the impeller shaft 128 in conventional, sturdy manner, such as by welding or other suitable strong, known type of interconnection. A plurality of individual blades 134 are welded or otherwise secured to the straight sides 136, 138, 140 and 142 which define the impeller body 132. The blades 134 are arranged about the body 132 in the configuration of helices 24, 26 to direct or push the manure (not shown) through the body 12 to the gate or opening 48 and thence to the spinner 154 for spreading purposes. As illustrated, each blade 134 preferably extends in length the entire thickness or width of its corresponding side 136, 138, 140 or 142. Each blade 134 is generally rectangular in configuration and terminates outwardly in a rounded edge 144 to efficiently conform to the bottom configuration of the spreader tank 12. The rounded edges provide an efficient shape for positive cleanout as the shaft is rotated. Preferably, the blades 134 tilt rearwardly at an angle of approximately five degrees to ten degrees from the normal to the axis of the shaft 128 to reduce friction and torque load. See FIG. 6. Additionally, the five to ten degree angularity of the blades aids in moving dry materials through the body by slowing down the progress of such materials.

The square corners 146, 148, 150, 152 defined by the straight, angularly interconnected body sides, 136, 138, 140, 142 create a pulsating or agitating action in the manure (not illustrated) when the shaft 130 is rotated to aid in breaking up large particles and in directing the manure toward the spinner 154. Additionally, the agitation of the manure caused by the repeated impacts of the impeller body corners 146, 148, 150, 152 together with the chopping action of the individual blades acts to discourage the manure from bridging over the impeller 128 to prevent interference with the movement of the manure within the body 12 toward the spinner 154. The cutting action of the individual blades 134 combines with the pulsating action created by the rotation of the body corners 146, 148, 150, 152 to pulsate or vibrate the material. The combined actions of the blades 134 and the body 132 as the shaft is rotated aids in transportation of the manure through the body and thus accommodates a great variety of materials from substantially semi-solid to substantially liquid compositions.

Referring now to FIGS. 4 and 5, one embodiment of a spinner 154 is illustrated comprising generally a shaft 156 which is suitably journalled within bearings 62 which are mounted within the spreader chamber walls 52, 53 for high speed rotation within a spreader chamber 50. Inasmuch as it is contemplated that a suitable gear train drive to rotate the spinner 154 can be developed in known manner similar to the drive previously shown and described in FIG. 1, the drive need not be further described at this time. Suffice it to say that it is desirable to rotate the spinner 154 at a considerably greater speed than the impeller 128, and any suitable known type of drive that will accomplish this result that could be efficiently employed would be satisfactory for the purpose.

The spreader or spinner 154 comprises a plurality of individual, angular scoops or buckets 158 each of which is defined by a radially oriented roof 160, a radially oriented floor 162, a left side 164 and a right side 166. Preferably, the respective roofs 160 and floors 162 of the individual scoops 158 are curved in the direction of rotation to aid in the manure throwing or spreading function. As illustrated, each scoop or bucket 158 defines an arc of ninety degrees whereby four angularly contiguous scoops 158 can be positioned about the spinner shaft 156. In a preferred embodiment, as best seen in FIG. 5, a plurality of four separators 168, 170, 172, 174 are employed to define four contiguous, circularly arranged scoops 158. As illustrated, each of the separators 168, 170, 172, 174 serves both as the roof 160 of one scoop and as the floor 162 of the next circularly adjacent scoop.

Referring still to FIGS. 4 and 5, it will be seen that the spinner 154 comprises a plurality of three juxtaposed scoop sections 176, 178, 180 each of which includes a plurality of four circularly adjacent scoops or buckets 158. It is noteworthy that the scoops 158 of the scoop section 176 are circularly angularly offset from the scoops 158 of the scoop section 178 by an angle of thirty degrees. Similarly, the scoops 158 of the scoop section 180 are circularly angularly offset from the scoops 158 of the scoop section 178 by an angle of thirty degrees to thereby provide a balanced design and to prevent undue vibration upon high speed rotation of the spinner. The staggered arrangement of the scoops 158 in the various scoop sections surprisingly results in considerably reduced horsepower requirements necessary to rotatively drive the spinner 154 during the manure spreading operations. The curvilinear design of the individual scoops or buckets 158 coupled with the high speed rotation of the spinner acts to trap a cushion or air about the shaft 156 whereby the material to be spread rides centrifically outwardly in the scoops, a phenomenon that also appears to reduce the quantity of energy required to rotate the spreader 154.

As best seen in FIG. 4, a sturdy, steel, replaceable chopping strip 182 is removably affixed at the respective ends of the separators 168, 170, 172, 174 to aid in chopping solid manure particles as the manure is urged toward the spinner 154 by the rotative action of the impeller 128. Preferably, teeth 184 are formed in the chopping strip edge to enhance the chopping action while the spinner is rotated at high speed. Due to the considerable wear occasioned by repeated impacts of the chopping strips 182 against the manure, the chopping strips are preferably removably connected by bolts 186 which position through aligned openings in the respective chopping strips 182 and the separators 168, 170, 172 and 174. Additionally, to increase the useful life of a chopping strip 182, a second row of teeth 188 preferably can be formed at the second longitudinal edge. Accordingly, when the first row of teeth 184 in a chopping strip demonstrate sufficient wear, then the second row of teeth 188 can be readily brought into use by simply removing the connecting bolts 186, reversing the chopping strip and then reconnecting with the second row of teeth positioned radially outwardly.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A manure spreader including:
   a container for holding manure to be spread;
   an impeller means arranged for rotation within said container to propel manure to an opening in said container;
   a first drive system connected to the impeller means to rotate said impeller means at a first slow, rotative speed;
   said container having an opening to provide an outlet through which manure can exit from said container;
   spreader means positioned outwardly adjacent to the opening in said container to receive manure and to spread the manure in a spray pattern;
   said spreader means comprising a chamber and a spinner, said spinner including a shaft and being adapted for rotation within said chamber to propel manure in a spray pattern, said spinner comprising at least two scoop sections angularly offset from one another on said shaft;
   said spinner being adapted to rotate at a second, fast, rotative speed; and
   a second drive system interconnected between said first drive system and said spinner to rotate said spinner at a second, fast, rotative speed.

2. The manure spreader of claim 1 wherein said impeller means comprises a non-circular, elongated impeller body defined by a plurality of angularly interconnected sides.

3. The manure spreader of claim 2 wherein said impeller body is rectangular in cross section.

4. The manure spreader of claim 3 wherein said rectangle is square.

5. The manure spreader of claim 2 wherein said impeller body has a first plurality of the blades are secured to and extend outwardly from one of said interconnected sides and a second plurality of the blades being secured to and extending from a another of said interconnected sides.

6. The manure spreader of claim 5 wherein said first plurality of blades are angularly offset from said second plurality of blades.

7. The manure spreader of claim 5 wherein said first plurality of blades and said second plurality of blades are cooperatively arranged to form portions of a helix on said interconnected sides.

8. The manure spreader of claim 5 wherein at least some of said blades terminate outwardly from said impeller body in a curved surface.

9. The manure spreader of claim 1 wherein said impeller means has a longitudinal axis and wherein at least some of the blades are generally rectangular and planar in configuration.

10. The manure spreader of claim 9 wherein at least some of said blades are oriented to project at less than ninety degrees from the axis of the impeller means.

11. The manure spreader of claim 9 wherein at least some of said blades are oriented at an angle between eighty degrees and eighty-five degrees from the longitudinal axis of said impeller means.

12. The manure spreader of claim 1 wherein at least some of said scoop sections are defined by a radially oriented roof and a radially oriented floor, said scoop sections being radially inwardly closed and being radially outwardly open.

13. The manure spreader of claim 12 wherein at least some of said roofs and said floors of said scoop sections are curved in the direction of rotation.

14. The manure spreader of claim 13 wherein one of said scoop sections is defined from the next circularly adjacent scoop section by a radially oriented separator.

15. The manure spreader of claim 14 wherein at least some of said separators serve both as the floor of one scoop and the roof of the next circularly adjacent scoop.

16. The manure spreader of claim 1 wherein at least some of said scoop sections terminate radially outwardly in a chopping strip.

17. The manure spreader of claim 16 wherein at least one of said chopping strips is provided with removing means to easily replace a said chopping strip.

18. The manure spreader of claim 16 wherein said chopping strip includes a plurality of teeth.

19. The manure spreader of claim 1 wherein said container sidewalls form a generally V-shaped cross sectional configuration and wherein said impeller means the bottom is located at the apex of the V-shape.

20. The manure spreader of claim 1 wherein the second, fast rotative speed is at least ten times faster than the first, slow rotative speed.

21. The manure spreader of claim 1 wherein the second, fast rotative speed is between ten and fifteen times greater than the first, slow rotative spped.

22. An apparatus for spreading manure having large particles comprising:

a container for holding manure to be spread, said container having means for funneling the manure under the influence of gravity to a predetermined location, an opening for discharging manure to be spread;

means for moving manure from the predetermined location, said means for moving manure located in said container; said means for moving manure operable to move manure in said container to said opening for discharging manure therefrom;

means for pulsating the manure in said container to break up any large particles in the manure to prevent manure from bridging over said means for moving the manure; and means for spreading the manure as it discharges from said opening.

23. The manure spreader of claim 22 wherein said means for spreading manure comprise a spinner having a plurality of scoop sections, said scoop sections being longitudinally juxtaposed along the shaft.

24. The manure spreader of claim 23 wherein at least a first and second of said plurality of scoop sections are similar in configuration.

25. The manure spreader of claim 24 wherein said first scoop section is angularly offset about said shaft from said second scoop section.

26. The manure spreader of claim 24 wherein said first scoop section is angularly offset about said shaft from second scoop section by an angle of at least thirty degrees.

27. The manure spreader of claim 22 wherein said impeller means for moving manure includes first plurality blades for moving manure in a first direction and a second plurality of blades for moving manure in a direction opposite said first direction.

28. The manure spreader of claim 22 wherein the means for moving manure comprise a rearwardly directed helix that terminates rearwardly at a location adjacent to the opening in said container.

29. The manure spreader of claim 27 or 28 wherein said means for moving manure comprise a forwardly directed helix that terminates forwardly at a location adjacent to the that opening in said container.

30. The manure spreader of claim 27 wherein said rearwardly directed helix and said forwardly directed helix intersect to form an unloading section, said unloading section being positioned adjacent to the tank sidewall opening.

31. The manure spreader of claim 1 or 22 including manure deflector means, said deflector means being positioned to be contacted by the manure discharge from said spreader to vary the spray pattern.

32. The manure spreader of claim 31 including adjustable means to move said deflector means relative to the spinner.

33. The invention of claim 22 wherein said container has a pair of side walls forming a general V shape with one of said side walls having a greater slope than the other side wall.

34. The method of moving a variety of manures from substantially semi-solid to substantially liquid compositions which contain particles of manure within a container of the type having a first wall, a second wall, interconnecting sidewalls that converge to funnel the manure to an impeller including an opening and an impeller having a plurality of sides comprising the steps of:

rotating the impeller and contacting a part of the manure with the sides and blades of the impeller;

cutting the contacted part of the manure with the blades of the impeller;

pulsating the contacted part of the manure with the impeller;

transporting the cut manure within the container in a direction towards the opening in the sidewall; and expelling the cut manure through the opening in the container.

35. The method of claim 34 wherein the step of rotating includes rotating the impeller at a first, slow rotative speed.

36. The method of claim 34 wherein the step of expelling the manure includes the steps of contacting the cut manure with a spinner and rotating the spinner to spreading the cut manure in a spray pattern exteriorly of the container.

37. The method of claim 36 including the step of rotating the impeller in a first direction and rotating the spinner in a second direction opposite to the first direction of the impeller rotation.

38. The method of claim 36 including the step of rotating the spinner at a second, fast rotative speed and the impeller at a first slow, rotative speed.

39. The method of claim 38 wherein the second speed is at least ten times faster than the first speed.

40. The method of claim 34 wherein the transporting includes moving a first part of the cut manure in a direction from the first wall toward the opening.

41. The method of claim 34 or 40 wherein the transporting includes moving a second part of the cut manure in a direction from the second wall toward the opening.

42. The method of moving a great variety of manures from a container to a field wherein the manure may contain particles that form self-adhering bridges comprising the steps of:

moving manure within a container to a discharge opening;

moving the manure into a position to be spread;

spreading the manure; and intermittently pulsating the manure in the container to break up large particles in the manure and thereby prevent manure from bridging in the container.

* * * * *